R. L. ELLERY.
PUPPET VALVE.
APPLICATION FILED MAR. 10, 1917.
1,230,140.
Patented June 19, 1917.
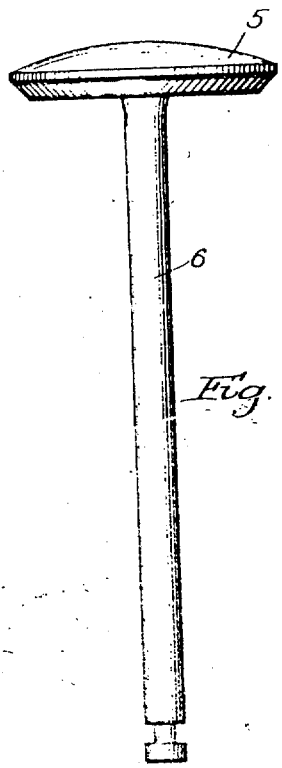
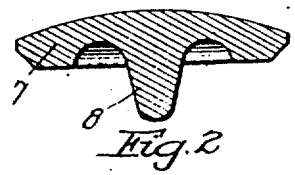
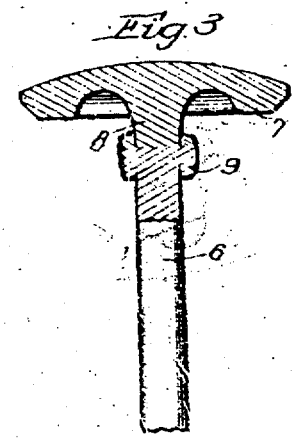
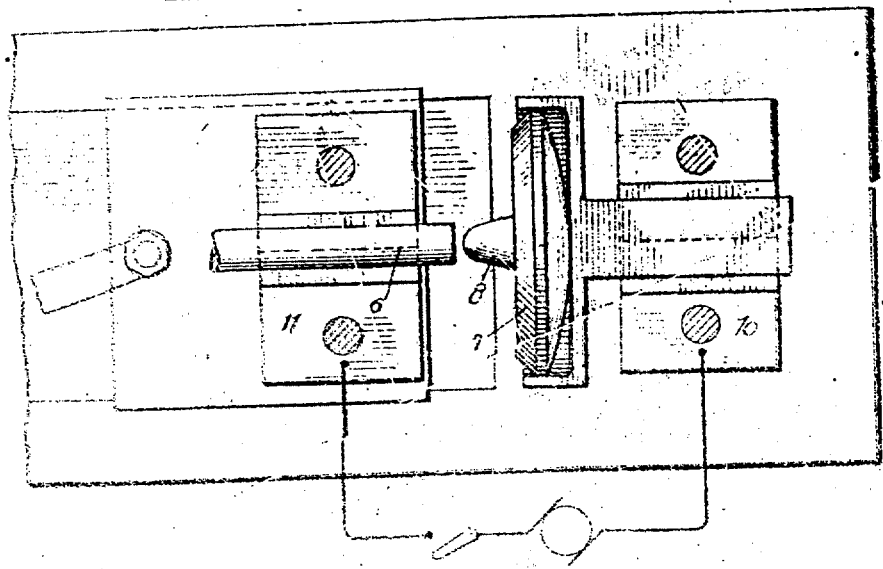

UNITED STATES PATENT OFFICE.

ROBERT L. ELLERY, OF TOLEDO, OHIO, ASSIGNOR, BY MESNE ASSIGNMENTS, TO PFANSTIEHL COMPANY, INC., A CORPORATION OF NEW YORK.

PUPPET-VALVE.

1,230,140.  Specification of Letters Patent.  Patented June 19, 1917.

Application filed March 10, 1917. Serial No. 153,792.

*To all whom it may concern:*

Be it known that I, ROBERT L. ELLERY, a citizen of the United States, residing at Toledo, in the county of Lucas and State of Ohio, have invented a certain new and useful Improvement in Puppet-Valves, of which the following is a full, clear, concise, and exact description, reference being had to the accompanying drawings, forming a part of this specification.

My invention relates to puppet valves for internal combustion engines, and particularly to a valve having a tungsten steel head and chrome vanadium steel stem, the head and stem being electrically welded together.

Tungsten or so-called high speed steel has been found to be the most satisfactory for valve heads because it can be operated at a high temperature without losing its hardness. Cast iron headed valves and nickel steel headed valves when operated at red heat become so soft that they often warp by reason of a chunk of carbon becoming lodged under one edge of the valve. Hard pieces of carbon also often embed themselves into the portion of the valve which engages the seat, thus causing so-called pitting and causing the valve to leak and require regrinding.

A great many valves are in use having tungsten steel heads and tungsten steel stems, the head and stem being formed of one piece of metal, the valve being made by a so-called swaging operation. Tungsten steel has the peculiarity of taking on a permanent expansion by reason of successive heating. It is common practice in regrinding reamers and the like made of high speed steel to heat and again cool them, whereupon it is found that the size of the reamer has been so increased that it may be reground to the same size as before it became worn. This peculiarity of high speed steel makes it undesirable for use as valve stems because, due to the successive heating and cooling of the stems, the stems become enlarged and frequently bind in the sleeves. It has been found absolutely necessary in using high speed tungsten steel stemmed valves to have the stems in the original installation so much smaller than the sleeves in which they operate that objectionable leakage occurs around them. Furthermore, they are necessarily somewhat rattly and create objectionable noise in the engine.

Prior to my own invention as described in my Patent No. 1,141,870, of June 1, 1915, I am not aware that anyone was able to form a homogeneous weld between tungsten steel and low carbon steel. I am aware that others have disclosed lathe tools in which tungsten steel is said to be welded to carbon steel, but experience shows that these so-called welds are not homogeneous and solid throughout the entire area of contact and as a matter of fact are only serviceable where the pressure exerted upon the two metals is toward the weld. The reason for this difficulty in welding high speed steel to ordinary steel lies primarily in the great difference in the welding temperatures of these steels, but secondarily in the great difference in the coefficient of expansion of these steels. Furthermore, the tungsten component of high speed steel oxidizes very readily at temperatures above 2000° Fahrenheit and forms a scale which prevents the tungsten steel from uniting homogeneously with other metals when it is attempted to unite them by the methods ordinarily used for welding. In addition to this, the heat at which a weld must be made between a tungsten steel body and a carbon steel body is so high as to burn the carbon out of the carbon steel and thus destroy its qualities except when welded by the process hereinafter described.

I have found that chrome vanadium steel makes an excellent valve stem; that stems made of this material are not subject to change in size by successive heatings and coolings; and that by the process hereinafter described they may be successively welded to tungsten steel.

In order to effect a weld between a tungsten steel body and a body of other material means must be provided for operating both materials at substantially their own welding temperatures. Means must also be provided for getting rid of the crust or oxid which forms on the highly heated material before it is heated to its welding temperature.

I accomplish the heating of the tungsten steel to a higher temperature than the chrome vanadium steel by so constructing the parts to be welded that the current density in the tungsten steel is greater than the current density in the chrome vanadium steel stem. I also bring about the rapid radiation of heat from the stem and so shape the tungsten steel head that the heat will not be rapidly radiated from the welded portions thereof.

I eliminate the oxidized portions of the tungsten steel head and chrome vanadium steel stems by forcing a comparatively large quantity of the molten metal out of the region of weld by applying pressure upon the stem in the direction of the head during the welding operation and thus causing the molten metal of both the tungsten steel head and the stem to flow outwardly so that new metals, which are concealed from access with the atmosphere, are brought together to form the weld. I have found in practice that it is important in order to secure a perfect weld that about $\frac{3}{32}$ of an inch of the high speed metal and about $\frac{1}{8}$ of an inch of the stem metal be extruded at the point of weld before all of the oxidized portions are eliminated. I have found that even with the above precautions a portion of the welds made by my process are faulty, but that the faulty welds can be readily detected by ringing the valves after the welding operation. The valves which are perfectly welded with a solid and homogeneous union will ring true and clear, while valves which are imperfectly welded resulting in even a slight crack or non-united portion will ring with a different and readily distinguishable sound. When it is attempted to weld tungsten steel heads to carbon steel stems a much greater percentage of loss occurs, firstly because the carbon seems to be driven out of the stem metal at the high temperature at which the weld must be made, and secondly because carbon steel being less tough than chrome vanadium steel the weld is more often broken by the difference in expansion.

My invention is illustrated in the accompanying drawings in which like parts are designated by similar characters of reference and in which—

Figure 1 is an elevation of the completed valve;

Fig. 2 is a high speed valve head as it appears before the welding operation;

Fig. 3 illustrates the weld between a head and stem before the surplus extruded metal has been removed; and Fig. 4 is a machine of the type in which I prefer to carry on my welding operation.

A valve made according to the process of my invention is illustrated in Fig. 1, the head 5 being made of a tungsten steel drop forging and the stem 6 being of chrome vanadium steel.

In Fig. 2 the head 7 is shown in its condition before the welding operation. From this it may be seen that the projection 8 thereon is cone shaped so that the current density will be greater near the tip than near the base of the cone whereby the greater heat will be concentrated at the tip.

In Fig. 3 is illustrated a valve head and stem after the welding operation and before the extruded metal 9 has been cut away. The metal 9 is highly oxidized and contains a considerable amount of embraced oxid both from the end of the stem and from the valve head. As heretofore pointed out the stem and head are forced together until all of the oxidized metal and all of the metal embracing oxids of either the head or stem metal is extruded beyond the line upon which the valve is to be finally finished.

In Fig. 4 is illustrated an electric welding machine in which the electrode 10 is so shaped as to conduct current to the whole of the tungsten steel head and in which the electrode 11 is so formed as to clamp upon the stem 6 and to absorb heat therefrom to prevent the temperature of the welding portion of the stem from rising above that at which the particular type of steel being welded properly welds.

I have found that the valve head may be hardened either before or after the welding operation. If hardened after the welding operation I prefer to heat the entire valve head and stem to about 2000° Fahrenheit and to then cool the head in oil, permitting the stem, however, to cool at its natural rate in the atmosphere. If the head is hardened before the welding operation I find that the periphery or seat engaging portion will not be sufficiently heated to cause the softening of the material during the welding operation.

What I claim is:

1. A puppet valve for internal combustion engines having a high speed steel head and a chrome vanadium steel stem, the union between said head and said stem being of solid homogeneous metal throughout.

2. A puppet valve for internal combustion engines having a tungsten steel head and a stem of chromium and vanadium alloy steel, the juncture of the head and stem metals being solid and homogeneous throughout.

In witness whereof, I hereunto subscribe my name this 3rd day of March, A. D. 1917.

ROBERT L. ELLERY.

Witnesses:
C. M. ZEIGEN,
E. E. THOMAS.